No. 760,745. PATENTED MAY 24, 1904.
C. S. LARIMER.
CIRCULAR MOLD FOR MAKING TILING, &c.
APPLICATION FILED NOV. 13, 1903.
NO MODEL.

Witnesses:
L. L. Feibrock.
R. H. Orwig.

Inventor: Charles S. Larimer,
By Thomas G. Orwig, Attorney.

No. 760,745. Patented May 24, 1904.

UNITED STATES PATENT OFFICE.

CHARLES S. LARIMER, OF SAC CITY, IOWA, ASSIGNOR TO THE CEMENT TILE WORKS, OF SAC CITY, IOWA.

CIRCULAR MOLD FOR MAKING TILING, &c.

SPECIFICATION forming part of Letters Patent No. 760,745, dated May 24, 1904.

Application filed November 13, 1903. Serial No. 181,104. (No model.)

*To all whom it may concern:*

Be it known that I, CHARLES S. LARIMER, a citizen of the United States, residing at Sac City, in the county of Sac and State of Iowa, have invented a new and useful Circular Mold for Making Tiling, &c., of which the following is a specification.

My object is to provide an improved simple, strong, and durable cylindrical mold specially adapted for making drain-tile and to facilitate the labor required in filling the mold with clay or any suitable plastic composition and also in separating and removing the mold and taking the tile out of the mold.

My invention consists in the manner of constructing and detachably connecting sections to produce two concentric cylinders and combining a hopper therewith, as hereinafter set forth, pointed out in my claims, and illustrated in the accompanying drawings, in which—

Figure 1:
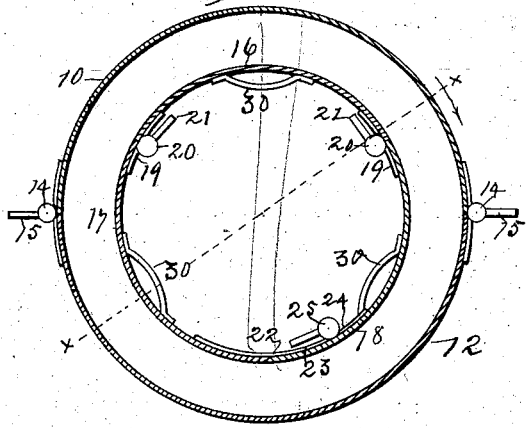
Figure 2:
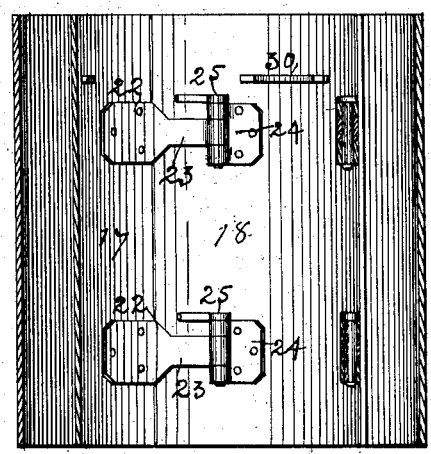
Figure 3:
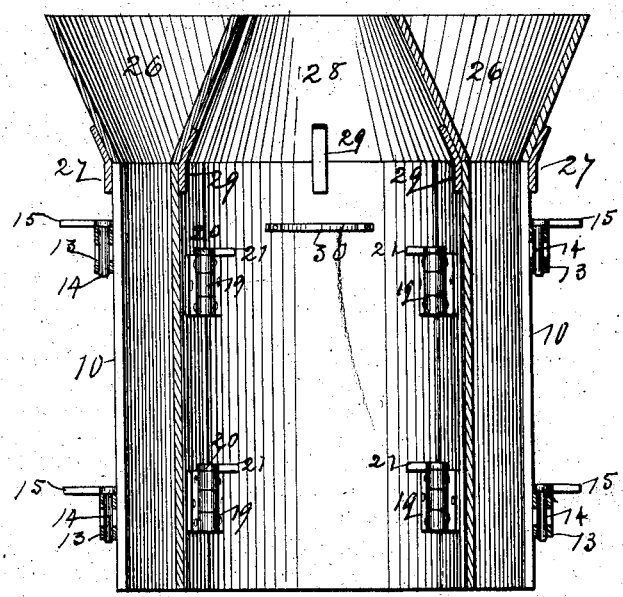

Figure 1 is a transverse sectional view of the two concentric cylinders and shows how they are formed in sections hinged together and provided with means to facilitate connecting and disconnecting the different sections of the cylinders. Fig. 2 is a vertical sectional view on the line $x\ x$ of Fig. 1 and shows a peculiar manner of detachably connecting two sections of the inner cylinder. Fig. 3 is a transverse vertical sectional view of the concentric cylinders and the hopper detachably connected therewith as required in practical use.

The numerals 10 and 12 designate semicircular sections of the outer cylinder detachably connected by means of fixed hinge-knuckles 13 at their vertical edges projecting outward, and detachable pins 14, that have handles 15, adapted to facilitate putting them in and out of the knuckles, as required for opening and closing the outer cylinder of the mold and for placing them in overlying positions to economize space in storing away when not in use. The inner and smaller cylinder is composed of three sections 16, 17, and 18, also detachably hinged together at their vertical edges in a peculiar manner to facilitate removing them from within a tile formed in the annular chamber between the two concentric cylinders. The sections are made of straight pieces of sheet metal and uniform in size and transverse curvature. The sections 16, 17, and 18 are hinged together by hinge irons or knuckles 19, that project inward, and pins 20, having handles 21, and the sections 17 and 18 are connected by hinge-irons 22, fixed to the section 17 and provided with extensions 23, adapted to project over the edge portion of the section 18, as shown in Figs. 1 and 2, and, as required, to be connected with the knuckles 24, fixed to the section 18 at some distance from its edge by removable pins 25. By thus hinging the sections together the inner cylinder can be contracted by lifting the pins 25 and moving the section 17 inward and allowing the free edge of the section 18 to overlap the outside edge portion of the section 17, so that the three sections can be readily moved longitudinally, as required, to separate the mold from a tile formed in the annular chamber existing between the two concentric cylinders.

It is obvious by lifting the pins from the knuckles and taking hold of the handles that extend transversely on the insides and top portions of the sections each section can be advantageously handled and the three sections can be placed in overlying position to facilitate transportation and to economize space in storing away when not in use.

To facilitate filling clay, &c., into the annular chamber of the mold, a tapering detachable hopper consisting of a funnel-shaped part 26 is fitted on top of the outer cylinder and provided with lugs 27 at its bottom edge to extend down over the outside of the cylinder, and an inverted-cone-shaped part 28 is fitted on top of the inner cylinder and provided with lugs 29, that extend down on the inside of the cylinder, as shown in Fig. 3, in such a manner that the hopper will greatly facilitate filling clay, cement, &c., into the annular chamber of the mold, as required to tamp it therein to produce tile.

Handles 30 are fixed to the insides and top portions of the sections 16, 17, and 18, as required to facilitate lifting and handling the sections of the inner cylinder. The pins provided with handles extending at right angles from their tops are greatly advantageous for lifting the pins out of the knuckles of the hinge-irons.

I am aware cylinders have been formed by hinging staves together so that the staves could be separated by removing keys from the hinge-joints composed of the overlapping ends of ribs fixed across the staves and keys extended horizontally through perforations in the overlying ends of the ribs bent inward at their ends; but my manner of fixing hinge-irons to the cylinders and providing pins with right-angled extensions at their tops to serve as handles is greatly advantageous in connecting and disconnecting the sections of the cylinders as is required in using them for molding tiling.

My manner of detachably connecting two of the sections of the inner cylinder by fixing hinge-irons to one of the sections at some distance from its edge and forming and fixing hinge-irons to the edge of a contiguous section, so as to project the hinge-knuckle across the edge portion of the adjoining section, is greatly advantageous in that it facilitates bringing the edges of the two sections together as required to produce a true circular cylinder and also aids in separating them and placing the one section into eccentric position relative to the other section, as required for separating and removing the inner cylinder from a tile molded between the two concentric cylinders.

Having thus set forth the purpose of my invention and its peculiar construction and manner of use, its practical utility and advantages will be readily understood by molders and others familiar with the art to which it pertains.

What I claim as new, and desire to secure by Letters Patent, is—

1. In a mold for making tile, a cylinder composed of three sections, two of said sections having fixed hinge-irons at their edges and removable pins provided with handles at their tops for detachably connecting them and one of said sections having hinge-irons at some distance from one of its edges and the adjoining section having fixed hinge-irons provided with extensions and knuckles at the ends of said extensions adapted to be detachably connected by means of removable pins and the hinge-joints at some distance from the edge of one of the sections and each section provided with a fixed handle on its inside and top portion, in combination with a concentric cylinder of larger diameter in the manner set forth, for the purposes stated.

2. A mold for making tiling comprising a cylinder composed of three sections, two of said sections having fixed hinge-irons at their edges and removable pins provided with handles at their tops for detachably connecting them and one of said sections having hinge-irons at some distance from one of its edges and the adjoining section having fixed hinge-irons provided with extensions and knuckles at the ends of said extensions adapted to be detachably connected by means of removable pins and the hinge-joints at some distance from the edge of one of the sections and each section provided with a fixed handle on its inside and top portion, a concentric cylinder of larger diameter composed of two sections detachably hinged together and an annular hopper detachably connected with the tops of the two concentric cylinders, in the manner set forth for the purposes stated.

CHARLES S. LARIMER.

Witnesses:
T. R. STEARNS,
C. C. JAMESON.